(12) United States Patent  
Son et al.

(10) Patent No.: US 7,924,756 B2
(45) Date of Patent: Apr. 12, 2011

(54) METHOD FOR CONTROLLING SLEEP-MODE OPERATION IN A COMMUNICATION SYSTEM

(75) Inventors: Yeong-Moon Son, Yongin-si (KR);
Jung-Je Son, Seongnam-si (KR);
Kang-Gyu Lee, Yongin-si (KR);
Geun-Hwi Lim, Seongnam-si (KR);
Jae-Hyuk Jang, Suwon-si (KR);
Jin-Hyun Youn, Hanam-si (KR);
Nam-Gi Kim, Suwon-si (KR); Min-Hee Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 774 days.

(21) Appl. No.: 11/860,928

(22) Filed: Sep. 25, 2007

(65) Prior Publication Data

US 2008/0075026 A1  Mar. 27, 2008

(30) Foreign Application Priority Data

Sep. 25, 2006 (KR) .................. 10-2006-0092833
Sep. 19, 2007 (KR) .................. 10-2007-0095573

(51) Int. Cl.
*G06C 17/00* (2006.01)
*H04W 4/00* (2009.01)
*H04W 68/00* (2009.01)
*H04B 1/38* (2006.01)

(52) U.S. Cl. ......... 370/311; 370/328; 455/458; 455/574
(58) Field of Classification Search .................. 370/311, 370/328; 455/458, 574
See application file for complete search history.

(56) References Cited

U.S. PATENT DOCUMENTS

| 2003/0040315 | A1 | 2/2003 | Khaleghi et al. |
| 2005/0002345 | A1 | 1/2005 | Pyo et al. |
| 2005/0059437 | A1* | 3/2005 | Son et al. ................ 455/574 |
| 2008/0153426 | A1* | 6/2008 | Son et al. ................ 455/68 |

FOREIGN PATENT DOCUMENTS

| KR | 102004002941 | 4/2004 |
| KR | 102004009380 | 11/2004 |
| KR | 102005008962 | 9/2005 |
| KR | 102007001645 | 2/2007 |

* cited by examiner

*Primary Examiner* — Ronald Abelson
(74) *Attorney, Agent, or Firm* — The Farrell Law Firm, P.C.

(57) ABSTRACT

A method for controlling a sleep-mode operation in a communication system is provided, in which a Mobile Station (MS) transitions to an awake state in a listening interval of the sleep mode, performs one of a first operation, a second operation, and a third operation in the awake state, and transitions to a sleep state if the MS determines that there is no data to transmit to a BS and no data to receive from the Base Station (BS) after the one operation is performed. The first operation is for receiving data from the BS, the second operation is for transmitting data to the BS, and the third operation is receiving data from the BS and transmitting data to the BS.

24 Claims, 4 Drawing Sheets

METHOD FOR CONTROLLING SLEEP-MODE OPERATION IN A COMMUNICATION SYSTEM

PRIORITY

This application claims priority under 35 U.S.C. §119(a) to a Korean Patent Application filed in the Korean Intellectual Property Office on Sep. 25, 2006 and assigned Serial No. 2006-92833 and an application filed in the Korean Intellectual Property Office on Sep. 19, 2007 assigned Serial No. 2007-95573, the contents of both of which are incorporated herein by reference.

BACKGROUND OF THE INVENTION

1. Field of the Invention

The present invention relates generally to a communication system, and in particular to a method for controlling a sleep-mode operation in a communication system.

2. Description of the Related Art

Communication systems are being developed to provide high-speed large data transmission/reception services to Mobile Stations (MSs). A primary example of these communication systems is the Institute of Electrical and Electronics (IEEE) 802.16e communication system, in which an MS maintains connection to a Base Station (BS) in normal mode.

The MS continuously monitors the downlink to receive data from the BS. Since the monitoring continues even when either the BS or the MS has no transmission data for the other party, the power consumption of the MS increases.

Considering that the IEEE 802.16e communication system was designed to support mobility to the MS, power consumption of the MS is a significant factor that affects overall system performance. To minimize this power consumption of the MS, a sleep-mode and an awake-mode operation are defined for the MS and the BS. Also, the MS periodically ranges to the BS to compensate for power as well as timing offset and frequency offsets, to thereby cope with changes in the channel status between the MS and the BS.

FIG. 1 illustrates a conventional signal flow for the sleep-mode operation in a communication system.

Referring to FIG. 1, to transition from an awake mode to sleep mode, an MS 100 transmits a MOBile_SLeeP-REQuest (MOB_SLP-REQ) message to a BS 110 in step 101. The BS 110 determines whether to approve the transition to the sleep mode based on the statuses of the BS 110 and the MS 100 and transmits a MOBile_SLeeP-ReSPonse (MOB_SLP-RSP) message corresponding to the determination result to the MS 100 in step 103. The MOB_SLP-RSP message includes a listening interval parameter. If the BS 110 has data to transmit to the MS 100 during a listening interval of the sleep mode, it can transmit to the MS 100 a MOBile_TRaFfic-INDication (MOB_TRF-IND) message with an IDentification (ID) of the MS 100 during the listening interval.

Upon receipt of the MOB_SLP-RSP message from the BS 110, the MS 100 starts a sleep-mode operation in accordance with the MOB_SLP-RSP message. The MS 100 is aware that it is to operate in accordance with the listening interval parameter included in the MOB_SLP-RSP message. Even though the MS 100 is in the sleep mode, if it has data to transmit to the BS 110, it can immediately wake up from the sleep mode immediately.

In step 105, the BS 110 transmits a MOB_TRF-IND message to the MS 100 during a listening interval of the sleep mode. Herein, it is assumed that the MOB_TRF-IND message does not include the ID of the MS 100. Thus, the MS 100 decodes the MOB_TRF-IND message and resumes the sleep-mode operation, confirming the absence of its ID in the message.

Upon generation of transmission data for the MS 100 in a listening interval of the sleep mode some time later, the BS 110 transmits to the MS 100 a MOB_TRF-IND message with the ID of the MS 100 in step 107. After decoding the MOB_TRF-IND message, the MS 100 transitions to the awake mode, confirming the presence of its ID, and receives the data from the BS 110.

After the data transmission/reception, the MS 100 and the BS 110 exchange a MOB_SLP-REQ message and a MOB_SLP-RSP message so that the MS 100 can return to the sleep mode. The message exchange leads to waste of uplink and downlink resources and power consumption. In addition, since the MS 100 has to perform bandwidth ranging by transmitting a BandWidth-REQuest (BW-REQ) message in order to be allocated a bandwidth in which it will transmit the MOB_SLP-REQ message, this increases a time delay in the MS's transitioning to the sleep mode.

The IEEE 802.16e communication system defines the following messages to support the above-described sleep-mode operation and awake-mode operation.

(1) MOB_SLP-REQ

The MS transmits the MOB_SLP-REQ message to the BS when it intends to transition from the awake mode to the sleep mode. The MOB_SLP-REQ message includes parameters, i.e. Information Elements (IEs) required for the transitioning to the sleep mode, as listed in Table 1 below.

TABLE 1

| Syntax | Size (bits) | Notes |
|---|---|---|
| MOB_SLP-REQ_Message_format( ) { | | |
|   Management message type = 50 | 8 | |
|   Number of Classes | 8 | Number of power saving classes |
|   for (i=0; i<Number of Classes; i++) { | | |
|     Definition | 1 | |
|     Operation | 1 | |
|     Power_Saving_Class_ID | 6 | |
|     if (Operation = 1) { | | |
|       Start_frame_number | 6 | |
|       Reserved | 2 | |
|     } | | |
|     if (Definition = 1) { | | |
|       Power_Saving_Class_Type | 2 | |
|       Direction | 2 | |
|       Traffic_triggered_wakening_flag | 1 | |
|       reserved | 3 | |
|       initial-sleep window | 6 | |
|       listening-window | 8 | |
|       final-sleep window base | 10 | |
|       final-sleep window exponent | 3 | |
|       Number_of_Sleep_CIDs | 3 | |
|       for (i=0; i<Number_of_Sleep_CIDs; i++ { | | |
|         CID | 16 | |
|       } | | |
|     } | | |
|   TLV encoded information | variable | |
| } | | |

Referring to Table 1, the MOB_SLP-REQ message has a plurality of IEs. Management Message Type indicates the type of the transmitted message. When Management Message Type is 50, it identifies the MOB_SLP-REQ message. Number of Classes is the number of power saving classes included in the MOB_SLP-REQ message. Definition defines a new power saving class or defines an existing power saving class. Operation indicates whether the power saving class is activated or deactivated. Power_Saving_Class_ID is the ID of the power saving class associated with a current operation. Start_frame_number indicates the activation time of the power saving class. Power_Saving_Class_Type indicates the type of the power saving class. Power saving class types are given as follows.

1) Type 1: a class for which the conventional sleep-mode operation is carried out. The MS transitions to the awake mode when data transmission/reception occurs during a listening interval or a MOB_TRF-IND message with a positive indication is received.

2) Type 2: a sleep window size is fixed and data is transmitted/received during a listening interval. The sleep window alternates with the listening interval.

3) Type 3: compared to Type 1 and Type 2 in which the sleep mode is kept unless a mode transition request message is received, Type 3 is a class that automatically ends the sleep mode after one sleep-mode operation, i.e. one sleep window. Type 3 is used mainly for management messages or multicast traffic.

Direction indicates uplink or downlink. Traffic_Triggered_Wakening_Flag (TTWF) applies only for power saving class Type 1 identified by Power_Saving_Class_Type. To be more specific, TTWF is used when the MS intends to maintain the sleep mode despite generation of data during a listening interval.

That is, if TTWF=0, the MS transmits/receives data during a listening interval and transitions to the sleep mode when the listening interval ends, that is, a sleep window starts. If the BS wants to transmit a Medium Access Control (MAC) Service Data Unit (SDU) for the power saving class during the listening interval, or if the MS transmits a BW-REQ message for a connection of the power saving class, or if the MS receives a MOB_TRF-IND message having a positive indication, i.e. the ID of the MS from the BS, the MS can terminate the sleep mode and transition to the awake mode. Also, the MS can terminate the sleep mode by a transaction with a MOB_SLP-REQ message and a MOB_SLP-RSP message.

When TTWF=1, if the MS receives a Packet Data Unit (PDU) from the BS during a listening interval or a management message commanding termination of the sleep mode, for example, a MOB_SLP-RSP message or a DownLink (DL) Sleep Control Extended Subheader, it should end the sleep mode unconditionally and transition to the awake mode. Also, when data is generated within the MS or when the MS transmits a management message requesting termination of the sleep mode, that is, a MOB_SLP-REQ message or a BW-REQ message and an uplink sleep control header to the BS, the MS should end the sleep mode unconditionally and transition to the awake mode. In other words, if TTWF=1, the MS wakes up to the awake mode, upon generation of traffic or a management message during a listening interval.

As described above, TTWF is used for the MS to maintain the sleep mode and transmit/receive data during a listening interval, for power saving class Type 1 as done with Type 2.

Initial-sleep Window indicates the start of the first sleep window. Listening Window indicates a requested listening interval. The maximum value of the sleep window depends on two parameters, final-sleep window base and final-sleep window exponent. The maximum sleep window is (final-sleep window base)$\times 2^{(final\text{-}sleep\ window\ exponent)}$. Number_of_Sleep_Connection IDs is the number of unicast Connection IDs (CIDs) corresponding to the power saving class.

(2) MOB_SLP-RSP

The BS transmits the MOB_SLP-RSP message to the MS to notify whether it approves or refuses the MS's transition to the sleep mode. Or the MOB_SLP-RSP message can be transmitted unsolicited. The MOB_SLP-RSP message includes parameters, i.e. IEs necessary for the MS to operate in the sleep mode, as illustrated in Table 2 below.

TABLE 2

| Syntax | Size (bits) | Notes |
|---|---|---|
| MOB_SLP-RSP_Message_format( ) { | | |
|   Management message type = 51 | 8 | |
|   Number of Classes | 8 | Number of power saving classes |
|   for (i=0; i<Number_of_Classes; i++) { | | |
|     Length of Data | 7 | |
|     Sleep Approved | 1 | |
|     Definition | 1 | |
|     Operation | 1 | |
|     Power_Saving_Class_ID | 6 | |
|     if (Sleep Approved == 1) { | | |
|       if (Operation = ) { | | |
|         Start_frame_number | 6 | |
|         Reserved | 2 | |
|       } | | |
|       if (Definition= 1) { | | |
|         Power_Saving_Class_Type | 2 | |
|         Direction | 2 | |
|         initial-sleep window | 8 | |
|         listening window | 8 | |
|         final-sleep window base | 10 | |
|         final-sleep window exponent | 3 | |
|         TRF-IND required | 1 | |
|         Traffic_triggered_wakening_flag | 1 | |
|         Reserved | 1 | |
|         if (TRF-IND required) { | | |
|           SLPID | 10 | |
|           Reserved | 2 | |
|         } | | |
|         Number_of_CIDs | 4 | |
|         for (i=0; i<Number_of_CIDs; i++) { | | |
|           CID | 16 | |
|         } | | |

TABLE 2-continued

| Syntax | Size (bits) | Notes |
|---|---|---|
|     if (MDHO or FBSS capability enabled) { | | If MDHO or FBSS capability is enabled in the REG-REQ/RSP message exchange. |
|         Maintain Diversity Set and Anchor BS | 1 | |
|         if (Maintain Diversity Set and Anchor BS) { | | |
|             MDHO/FBSS duration(s) | 3 | |
|         } | | |
|     } | | |
| } | | |
| Padding | variable | If needed for alignment to byte boundary |
|     if (Operation = 1) { | | |
|         Power Saving Class TLV encoded information | Variable | |
|     } | | |
| } else { | | In case Sleep Approved == 0 |
|     REQ-duration | 8 | |
| } | | |
|     TLV encoded information | variable | |
| } | | |

Referring to Table 2, the MOB_SLP-RSP message includes a plurality of IEs. The MOB_SLP-RSP message is also transmitted based on a basic CID of the MS.

Management Message Type indicates the type of the transmitted message. If Management Message Type is 51, it identifies the MOB_SLP-RSP message. Length of Data provides the number of bytes of a power saving class. Sleep Approved indicates whether the request for activation or deactivation of the power saving class is approved or not. If Sleep Approved is 1 and Operation is 1 (activation), Start_frame_number is included. If Sleep Approved is 1 and Definition is 1, Power_Saving_Class_Type, Direction, initial-sleep window, listening window, final-sleep window base, final-sleep window exponent, TRF-IND required, and TTWF are included. TRF-IND required applies only for power saving class Type 1. This means that the BS should transmit at least one MOB_TRF-IND message to the MS in every listening interval.

(3) MOB_TRF-IND

The MOB_TRF-IND message is transmitted from the BS to the MS during a listening interval, indicating the presence or absence of data for the MS. The MOB_TRF-IND message is broadcast or multicast, compared to the MOB_SLP-REQ or MOB_SLP-RSP message. The format of the MOB_TRF-IND message is given in Table 3 below.

TABLE 3

| Syntax | Size (bits) | Notes |
|---|---|---|
| MOB_TRF-IND_Message_format( ) { | | |
|     Management message type = 52 | 8 | |
|     FMT | 1 | |
|     if (FMT == 0) { | | |
|         SLPID Group Indication bit-map | 32 | Nth bit of SLPID-Group indication bit-map [MSB corresponds to N = 0] is allocated to SLPID Group that indicates MS with SLPID values from N+32 to N+32+31<br>Meaning of this bit<br>0: There is no traffic for all the 32 MSs which belong to the SLPID-Group.<br>1: There is traffic for at least one MS in SLPID-Group. |
|         Traffic Indication Bitmap | variable | Traffic Indication bitmap comprises the multiples of 32-bit long Traffic Indication unit. A Traffic Indication unit for 32 SLPIDs is added to MOB_TRF-IND message whenever its SLPID Group is set to 1. 32 bits of Traffic Indication Unit (starting from MSB) are allocated to MS in the ascending order of their SLPID values:<br>0: Negative indication<br>1: Positive indication |
|     } else { | | |
|         Num_Pos | 8 | Number of CIDs following |
|         for (i=0; i<Num_Pos; i++) { | | |
|             SLPIDs | 10 | |
|         } | | |
|     } | | |
|     Padding | variable | If needed, for alignment to byte boundary. |
|     TLV encoded Items | Variable | |
| } | | |

Referring to Table 3, the MOB_TRF-IND message indicates whether the BS has data to be transmitted to the MS. The MS receives the MOB_TRF-IND message during the listening interval and decides as to whether to transition to the awake mode or stay in the sleep mode.

If the MS is to transition to the awake mode, it checks frame synchronization. If a current frame sequence number is different from an expected frame sequence number, the MS may request retransmission of lost data. Meanwhile, if the MS fails to receive a MOB_TRF-IND message during the listening interval, or if the MS receives a MOB_TRF-IND message indicating the absence of data directed to the MS, the MS can be kept in the sleep mode.

The MOB_TRF-IND message also has a plurality of IEs. Management Message Type indicates the type of the transmitted message. If Management Message Type is 52, it identifies the MOB_TRF-IND message. FMT indicates the MOB_TRF-IND message takes the format of a SLeeP IDentifier (SLPID) bitmap or SLPIDs.

(4) DL Sleep Control Extended Subheader

The DL Sleep Control Extended Subheader is transmitted from the BS to the MS in order to activate or deactivate a power saving class. The DL Sleep Control Extended Subheader has the following configuration.

TABLE 4

| Name | Size (bits) | Description |
| --- | --- | --- |
| Power_Saving_Class_ID | 6 | Power Saving Class ID this command refers to. |
| Operation | 1 | 1 = activate Power Saving Class<br>0 = de-activate Power Saving Class |
| Final_Sleep_Window_Exponent | 3 | For Power Saving Class Type III only: assigned factor by which the final-sleep window base is multiplied in order to calculate the duration of single sleep window requested by the message. |
| Final_Sleep_Window_Base | 10 | For Power Saving Class Type III only: the base for duration of single sleep window requested by the message. |
| Reserved | 4 | |

Referring to Table 4, the IEs of the DL Sleep Control Extended Subheader have been described with reference to the MOB_SLP-RSP message and thus their detailed description is not provided herein.

As described above, in the IEEE 802.16e communication system, for power saving class Type 1, the MS can maintain the sleep mode or deactivate it according to TTWF in the sleep-mode operation when receiving a MAC SDU from the BS during a listening interval. However, if the MS intends to maintain the sleep mode, the time of returning to the sleep mode after the listening interval is not clearly specified. In addition, TTWF is preset in initial MOB_SLP-REQ and MOB_SLP-RSP messages exchanged between the MS and the BS and it may occur that the TTWF needs to be changed during the sleep-mode operation. However, there is no specified operation for changing the TTWF.

SUMMARY OF THE INVENTION

An aspect of the present invention is to address at least the problems and/or disadvantages and to provide at least the advantages described below. Accordingly, an aspect of the present invention is to provide a method for controlling a sleep-mode operation in a communication system.

An aspect of the present invention provides a method for controlling a sleep-mode operation so as to reduce resource consumption in a communication system.

An aspect of the present invention provides a method for controlling a sleep-mode operation so as to reduce the power consumption of an MS in a communication system.

In accordance with the present invention, there is provided a method for controlling a sleep-mode operation in an MS in a communication system, in which the MS transitions to an awake state in a listening interval of sleep mode, performs one of a first operation, a second operation, and a third operation in the awake state, and transitions to a sleep state if the MS determines that there is no data to transmit to a BS and no data to receive from the BS after the one operation is performed. The first operation is for receiving data from the BS, the second operation is for transmitting data to the BS, and the third operation is for receiving data from the BS and transmitting data to the BS.

In accordance with the present invention, there is provided a method for controlling a sleep-mode operation in a BS in a communication system, in which the BS determines that an MS has entered into an awake state in sleep mode, performs one of a first operation, a second operation, and a third operation after determining that the MS has entered into the awake state, and determines that the MS has transitioned to a sleep state, if the BS determines that there is no data to transmit to the MS and no data to receive from the MS after the one operation is performed. The first operation is for transmitting data to the MS, the second operation is for receiving data from the MS, and the third operation is for transmitting data to the MS and receiving data from the MS.

In accordance with the present invention, there is provided a method for controlling a sleep-mode operation in an MS in a communication system, in which the MS transmits a first message including a variable listening interval indicator (VLII) to a BS in order to transition from awake mode to sleep mode, transitions to an awake state of the sleep mode, when a listening interval comes in a sleep state of the sleep mode, and performs one of a first operation, a second operation, and a third operation according to the VLII in the awake state. The first operation is to receive data from the BS, the second operation is to transmit data to the BS, and the third operation is to receive data from the BS and transmit data to the BS.

In accordance with the present invention, there is provided a method for controlling a sleep-mode operation in a BS in a communication system, in which the BS receives a first message including a VLII from an MS, transmits a second message including the VLII to the MS in response to the first message, and performs one of a first operation, a second operation, and a third operation according to the VLII, after determining that the MS is kept in a sleep state of sleep mode and transitions to an awake state of the sleep mode as a listening interval comes. The first operation is to transmit data to the MS, the second operation is to receive data from the MS, and the third operation is to transmit data to the MS and receive data from the MS.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Preferred embodiments of the present invention provide a method for controlling a sleep-mode operation in a communication system. While the present invention is described in the context of an IEEE 802.16e communication system, it is to be clearly understood that the present invention is also applicable to other communication systems.

Although it is described that one MS and one BS control a sleep-mode operation between them and perform associated operations, this is merely a preferred application. Thus, the same control and associated operation applies to the instance of a plurality of MSs.

In accordance with present invention, for an initial entry into sleep mode, the MS and the BS exchange a MOB_SLP-REQ message and a MOB_SLP-RSP message. The sleep mode involves sleep windows and listening intervals. A time to enter into the sleep mode, a sleep window size, and a listening interval length are determined by the transmission and reception of the MOB_SLP-REQ and MOB_SLP-RSP messages. A state in which the MS consumes power by exchanging data with the BS or in a waiting state is defined as awake state and a state in which the MS discontinues data transmission/reception to/from the BS to save power is defined as sleep state.

The present invention discloses an operation when the MS, which has entered the sleep mode, been placed in awake state in a listening interval, and received a MOB_TRF-IND message from the BS, has to return to sleep state due to non-data transmission and reception between the MS and the BS.

It is assumed that MOB_TRF-IND message transmission from the BS to the MS precedes data transmission from the BS to the MS, while a data transmission method for reducing power consumption according to the present invention is also applicable to data transmission/reception without MOB_TRF-IND message transmission.

Figure 1:
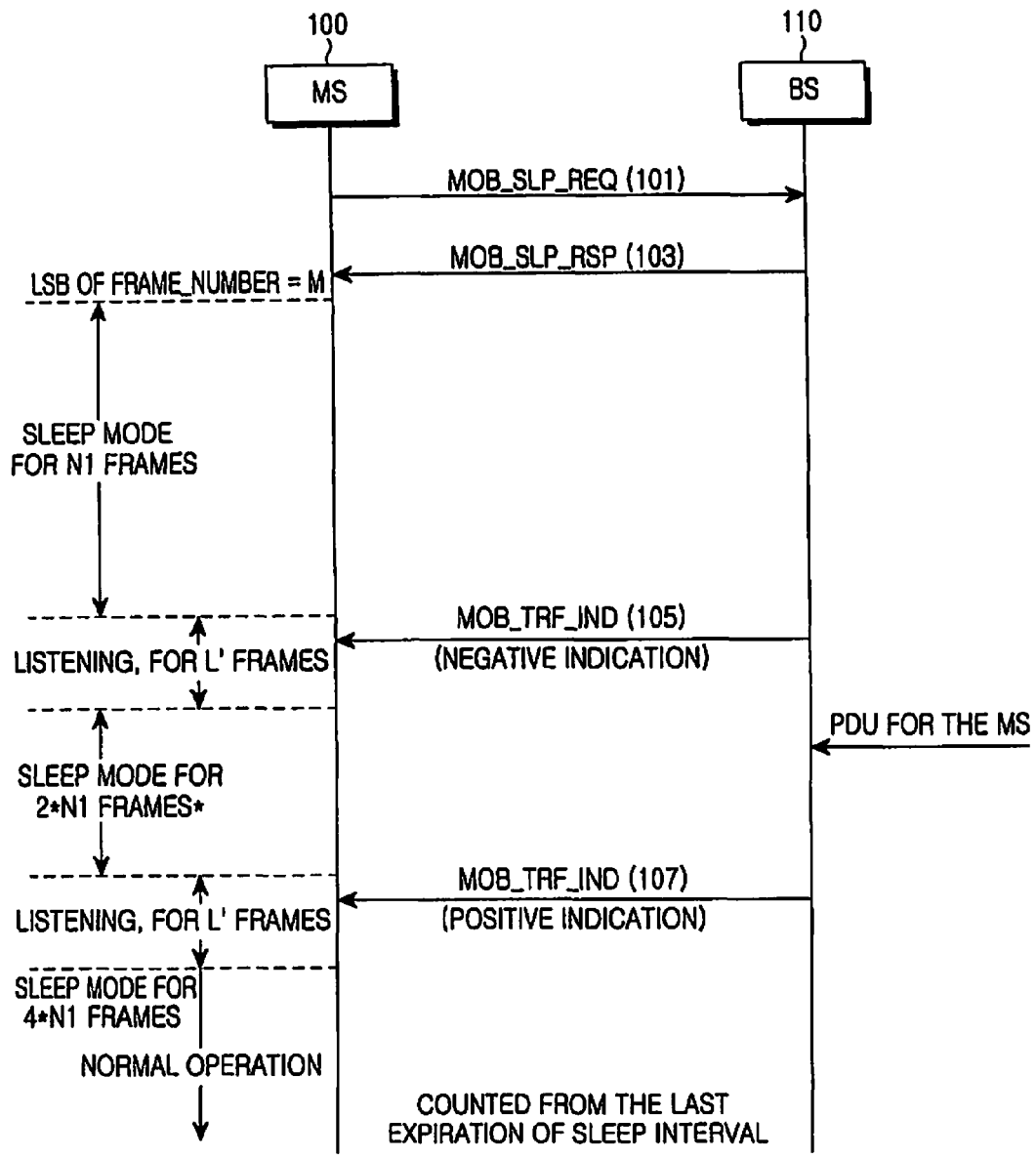
FIG. 1 illustrates a conventional signal flow for a sleep-mode operation in a communication system.
Figure 2:
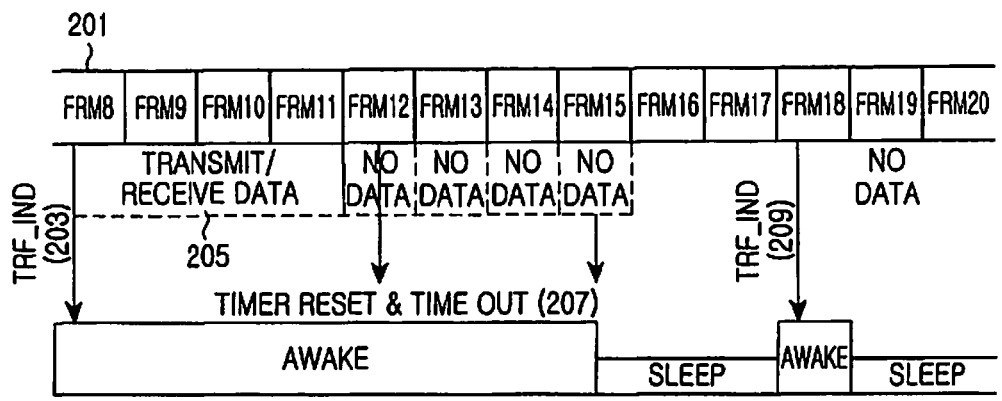
FIG. 2 illustrates a data transmission from a BS in a communication system according to the present invention.

FIG. 2 illustrates a data transmission from the BS in the communication system according to the present invention.

Referring to FIG. 2, for an initial transition to the sleep mode, the BS and the MS determine a time to enter into the sleep mode, a sleep window size, and a listening interval length by exchanging a MOB_SLP-REQ message and a MOB_SLP-RSP message. Then the MS enters into the sleep mode. A sleep-mode entering process is known and thus will not be described herein. It is assumed that the sleep window size is 8 frames, the listening interval length is 2 frames, and ordering of the frames is from frame (frm) #0 to frm #N as indicated by reference numeral 201. Hence, the BS is aware that the BS is in a sleep window of the sleep mode from frm #0 to frm #7.

When frm #8 starts, the BS determines that the listening interval has started. When the BS has transmission data for the MS, it transmits a MOB_TRF-IND message with an ID of the MS to the MS in frm #8 in step 203. After the MOB_TRF-IND message transmission, the BS immediately transmits the data to the MS in step 205. If the MS has transmission data for the BS after receiving the MOB_TRF-IND message, it transmits the data to the BS in step 205. Simultaneously with the data transmission/reception, the MS activates a timer T1, starting from 0. The timer T1 is used for the MS to determine the absence of data to receive from the BS and the absence of transmission data for the BS. The timer T1 can also be used for the MS to determine the absence of data to receive from the BS but the presence of transmission data for the BS, and vice versa. Therefore, when data transmission/reception occurs between the BS and the MS, the timer T1 is reset to 0.

If the BS completes data transmission/reception to/from the MS in frm #11 and there is no data to be transmitted/received between the MS and the BS in frm #12, the MS increases the timer T1 by 1 to return to the sleep state in step 207. Assuming that a threshold set for the timer T1 is 4 frames, the timer T1 counts frm #12 through frm #15. If there is no data for transmission and reception between the MS and the BS until the timer T1 expires, the MS immediately enters into the sleep state. Thus, the next data transmission and reception occurs in the next listening interval.

Figure 3:
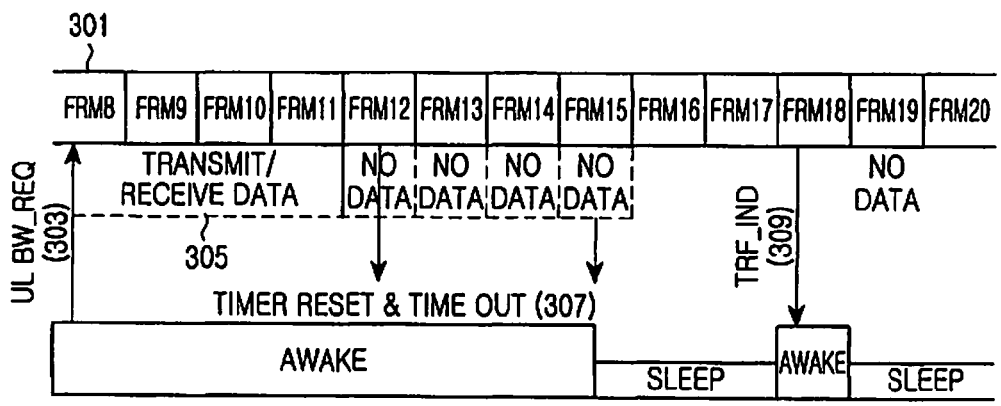
FIG. 3 illustrates a data transmission from an MS in the communication system according to the present invention.

FIG. 3 illustrates a data transmission from the MS in the communication system according to the present invention.

Referring to FIG. 3, for an initial transition to the sleep mode, the BS and the MS determine a time to enter into the sleep mode, a sleep window size, and a listening interval length by exchanging a MOB_SLP-REQ message and a MOB_SLP-RSP message, and then the MS enters into the sleep mode. A sleep-mode entering process is known and thus will not be described herein. It is assumed that the sleep window size is 8 frames, the listening interval length is 2 frames, and ordering of the frames is from frm #0 to frm #N as indicated by reference numeral 301.

Hence, the MS is aware that the sleep window ranges from frm #0 to frm #7 and transitions to the sleep mode. When frm #8 starts, the MS recognize that the listening interval has started and transmits an UpLink-BW-REQ (UL-BW-REQ) message to the BS in frm #8 in step 303. After the UL-BW-REQ transmission, the MS transmits data to the BS and, in the presence of data for the MS in the BS, receives the data from the BS in the listening interval in step 305. Simultaneously with the data transmission, the MS activates the timer T1, starting from 0. The timer T1 is used for the MS to determine the absence of transmission data for the BS and data to be received from the BS. The timer T1 can also be used for the MS to determine the absence of data to receive from the BS but the presence of transmission data for the BS, and vice versa. Therefore, when data transmission/reception occurs between the BS and the MS, the timer T1 is reset to 0. If the MS completes data transmission/reception to/from the BS in frm #11 and there is no data to be transmitted/received between the MS and the BS in frm #12, the MS increases the timer T1 by 1 to return to the sleep state in step 307. Assuming that a threshold set for the timer T1 is 4 frames, the timer T1 counts frm #12 through frm #15.

If there is no data for transmission and reception between the MS and the BS until the timer T1 expires, the MS immediately enters into the sleep state. Thus, the next data transmission and reception occurs in the next listening interval.

Figure 4:
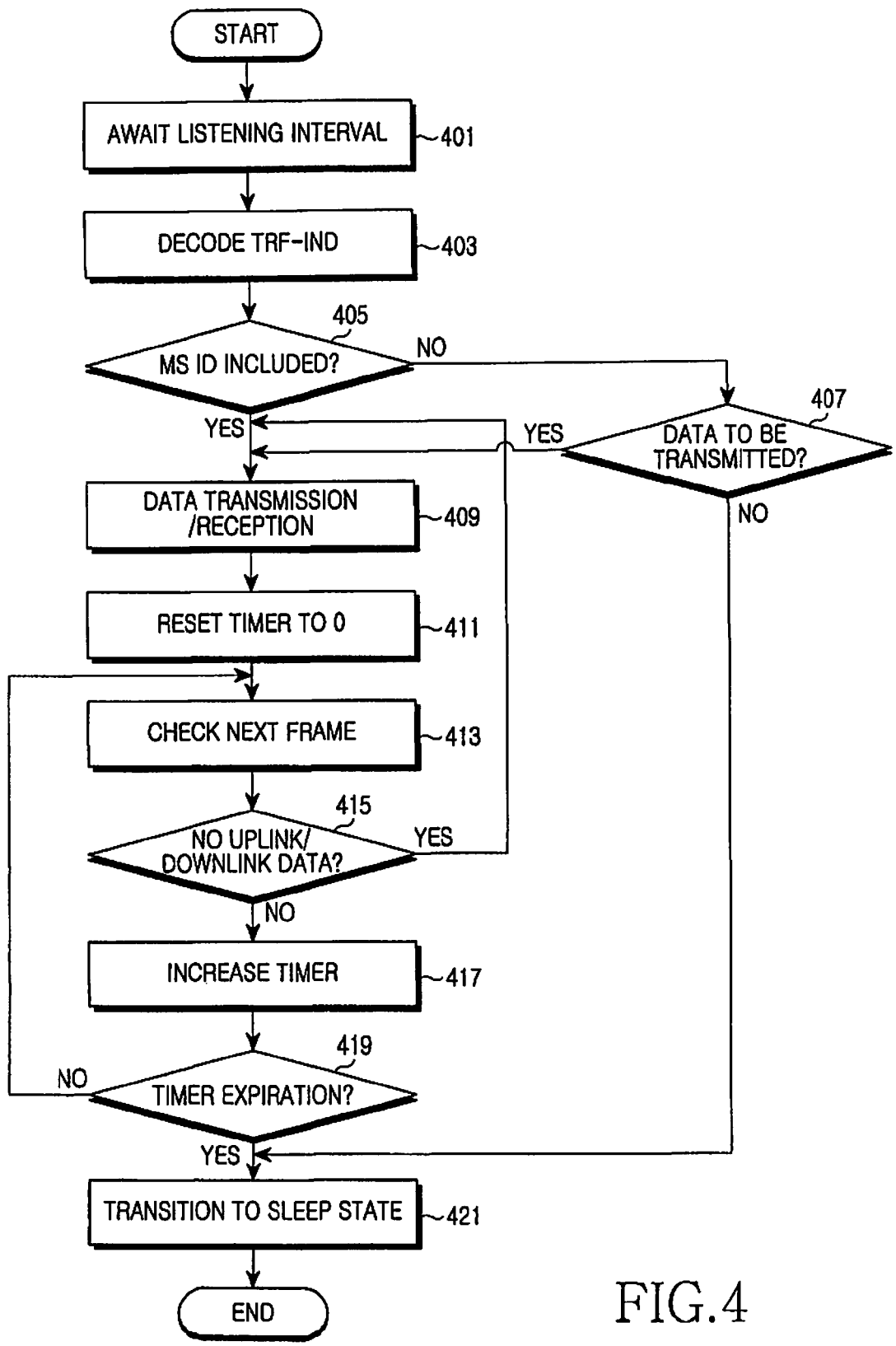
FIG. 4 illustrates an operation of the MS in the communication system according to the present invention.

FIG. 4 illustrates the operation of the MS in the communication system according to the present invention.

Referring to FIG. 4, the MS is placed in a sleep window of the sleep mode, wakes up in a listening interval, and awaits reception of data from the BS in the listening interval in step 401. In step 403, the MS receives a MOB_TRF-IND message from the BS and decodes the MOB_TRF-IND message. The MS then checks whether the MOB_TRF-IND message includes an ID of the MS in step 405. If the MOB_TRF-IND message includes the MS ID, the MS receives data from the BS in step 409 and proceeds to step 411. However, if the MOB_TRF-IND message does not include the MS ID, the MS checks the status of an uplink buffer to determine whether there is transmission data for the BS in step 407. In the presence of the transmission data, the MS transmits the data to the BS in step 409 and proceeds to step 411.

In step 411, the MS immediately activates the timer T1, starting from 0 when the data transmission/reception takes place between the MS and the BS. The MS then checks the presence or absence of data to be transmitted to the BS in the next frame in step 413. If the data transmission/reception is completed and there is neither data to transmit to the BS or nor data to receive from the BS in step 415, the MS increases the timer T1 to 1 in step 417. When the timer T1 reaches a predetermined threshold in step 419, the MS returns proceeds to the sleep state in step 421 and ends the procedure.

Meanwhile, if there is data to transmit to the BS and data to receive from the BS in step 415, it returns to step 409.

If the MS has no transmission data for the BS in step 407, it jumps to step 421 in which it transitions to the sleep state, and ends the procedure.

Figure 5:
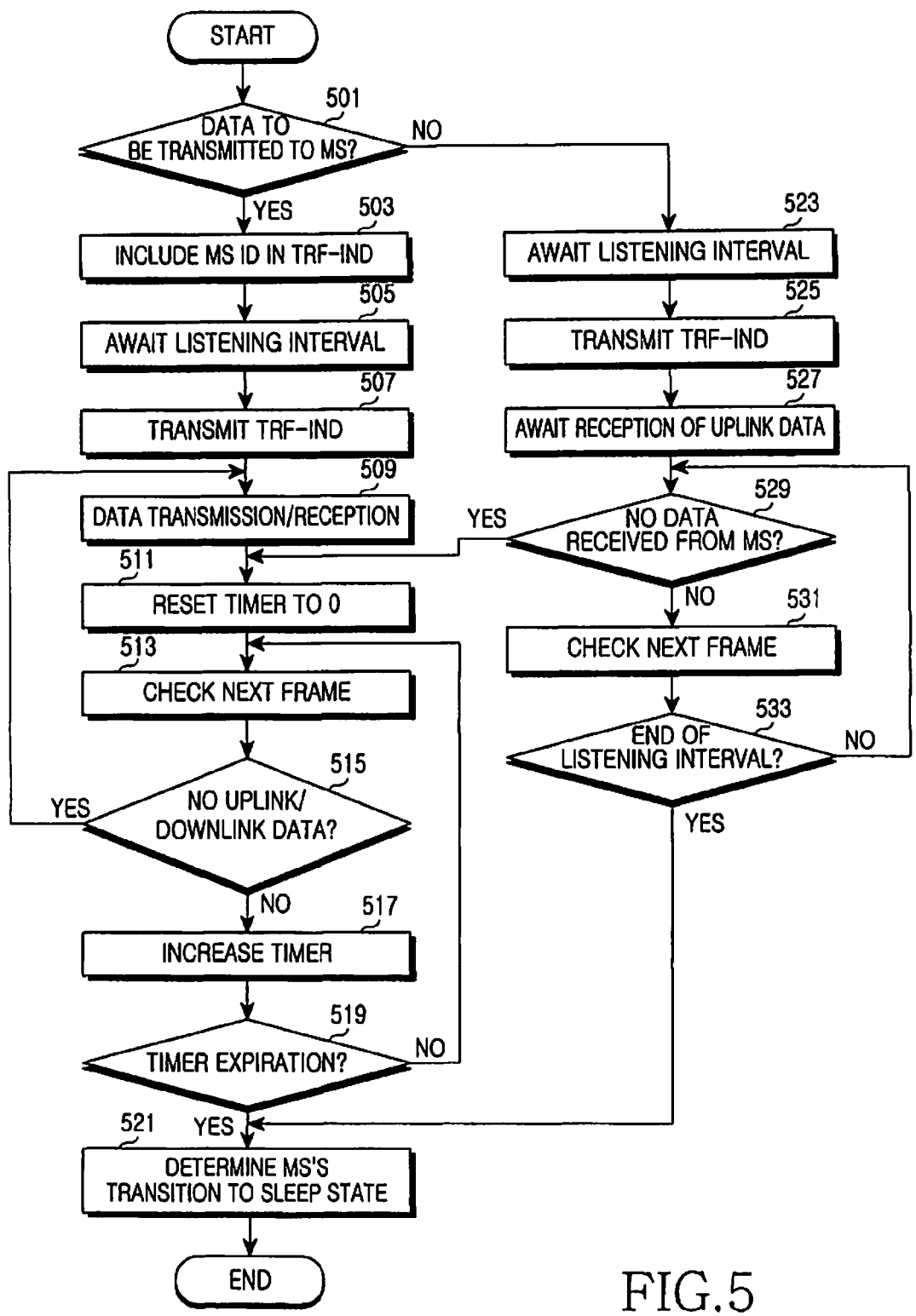
FIG. 5 illustrates an operation of the BS in the communication system according to the present invention.

FIG. 5 illustrates the operation of the BS in the communication system according to the present invention.

An operation of the BS in the presence of transmission data for the MS will first be described.

Referring to FIG. 5, the BS determines whether it has transmission data for the MS in step 501. In the presence of the transmission data, the BS includes an ID of the MS in a MOB_TRF-IND message in step 503 and awaits a listening interval in step 505. In step 507, the BS transmits the MOB_TRF-IND message to the MS. The BS then transmits the data to the MS in step 509 and simultaneously activates the timer T1 to 0 in step 511. In step 513, the BS determines whether there is data to transmit to the MS in the next frame. In the absence of the transmission data for the next frame in step 515, the BS increases the timer T1 by 1 in step 517 and compares the count of the timer T1 with a predetermined threshold in step 519. If the count reaches the threshold, the BS considers that the MS has transitioned to the sleep state in step 521 and ends the procedure.

Now a description will be made of a data reception from the MS in the BS.

Referring to FIG. 5, in the absence of transmission data for the MS in step 501, the BS awaits a listening interval in step 523 and transmits a MOB_TRF-IND message without the ID of the MS to the MS in step 525. In step 527, the BS awaits reception of uplink traffic in the listening interval. If the BS has not received data from the MS in step 529, it determines whether there is data to transmit or receive in the next frame in step 531. If the listening interval ends in step 533, the BS considers that the MS has transitioned to the sleep state in step 521. If the listening interval has not ended, the BS returns to step 529 to await reception of uplink traffic.

If the BS has received data from the MS in step 529, the BS proceeds to step 511.

While not shown, a method for controlling a sleep-mode operation using timers T2 and T3 will be described.

For an initial transition to the sleep mode after an initial data transmission and reception, the BS and the MS determine a time to enter into the sleep mode, a sleep window size, and a listening interval length by exchanging a MOB_SLP-REQ message and a MOB_SLP-RSP message, and then the MS enters into the sleep mode. A sleep-mode entering process is known and thus will not be described herein.

When the listening interval arrives, the BS transmits a MOB_TRF-IND message to the MS and then transmits data to the MS. Simultaneously, the timers T2 and T3 are activated, starting from 0. The timer T2 counts time so that the MS can determine the absence of data to receive from the BS or the BS can determine the absence of transmission data for the MS. The timer T3 counts time so that the MS can determine the absence of transmission data for the BS or the BS can determine the absence of data to receive from the MS.

Simultaneously with the data transmission/reception, the timers T2 and T3 are activated, starting from 0. In the absence of data to receive in the next frame from the BS in the MS or in the absence of transmission data for the MS in the next frame in the BS, the timer T2 increases to a threshold, 4 frames. Similarly, in the absence of transmission data for the BS in the MS or in the absence of data to receive from the MS in the BS, the timer T3 increases up to the threshold, 4 frames. If data transmission/reception does not occur until the counts of both the timers T2 and T3 exceed 4 frames, the MS immediately transitions to the sleep state.

Another exemplary embodiment of the present invention is contemplated in which the sleep-mode operation according to the first exemplary embodiment of the present invention applies to power saving class Type 1 (Power_Saving_Class_Type indicates Type 1) with TTWF=0 set in the MOB_SLP-REQ message and the MOB_SLP-RSP message.

TTWF is used for the MS to maintain the sleep state even though data is generated during a listening interval. That is, in accordance with the second exemplary embodiment of the present invention, data transmission/reception can be performed during a fixed-length listening interval alternating with a sleep window. Also, data transmission/reception can be carried out during a variable-length listening interval, that is, the listening interval lasts while the data transmission/reception continues. These two operations are referred to as a new sleep-mode operation.

For control of a sleep-mode operation between the BS and the MS, the following parameter is newly defined. The parameter is added in the form of TLV encoding illustrated in Table 5 to a REGistration-REQuest (REG-REQ) message and a REGistration-ReSPonse (REG-RSP) message.

TABLE 5

| Type | Length | Value | Scope |
|---|---|---|---|
| X | 1 | Support of new sleep mode with variable listening Interval<br>0x00: Not Support (default)<br>0x01: Support | REG-REQ/RSP |

When the TLV encoding is not included in the REG-REQ message and the REG-RSP message, it is considered to be a default value '0'. If Variable Listening Interval Indicator (VLII) is set to '0', this means that the new sleep-mode operation is not available. VLII will be described later in more detail.

If the BS supports the new sleep-mode operation, it determines whether the MS also supports the new sleep-mode operation. If the MS does not support the new sleep-mode operation, the BS transmits the REG-RSP message without the TLV encoding, or sets the VLII to 0 in a MOB_SLP-RSP message transmitted later.

In the opposite case, if the MS supports the new sleep-mode operation, it determines whether the BS can support the new sleep-mode operation. If the BS does not support the new sleep-mode operation, the MS transmits an REG-REQ message without the TLV encoding or sets the VLII to 0 in a later transmitted MOB_SLP-REQ message.

The TLV encoding can be transmitted/received in a message other than the REG-REQ message and the REG-RSP message, for example, a Subcarrier Station Basic Capability REQuest (SBC-REQ) message or a Subcarrier Station Basic Capability ReSPonse (SBC-RSP) message.

To perform the new sleep-mode operation for power saving class Type 1 with TTWF=0, existing messages need to be modified as follows.

(1) MOB_SLP-REQ

The MOB_SLP-REQ message is a message that the MS transmits to the BS to transition from the awake mode to the sleep mode. The MOB_SLP-REQ message has the following format.

TABLE 6

| Syntax | Size | Notes |
|---|---|---|
| MOB_SLP-REQ_Message_format( ) { | — | — |
|   Management message type = 50 | 8 bits | — |
|   Number of Classes | 8 bits | Number of power saving classes. |
|   for (i = 0; i < Number_of_Classes; i++) { | — | — |
|     Definition | 1 bit | — |
|     Operation | 1 bit | — |
|     Power_Saving_Class_ID | 6 bits | — |
|     if (Operation == 1) { | — | — |
|       Start_frame_number | 7 bits | — |
|       Reserved | 1 bit | — |
|     } | | |
|     if (Definition = 1) { | — | — |
|       Power_Saving_Class_Type | 2 | — |
|       Direction | 2 | — |

TABLE 6-continued

| Syntax | Size | Notes |
|---|---|---|
|       TRF-IND_Required | 1 | |
|       Traffic_triggered_wakening_flag | 1 | |
|       Variable Listening Interval Indicator | 1 | |
|       Reserved | 2 | |
|       initial-sleep window | 8 | |
|       listening-window | 8 | |
|       final-sleep window base | 10 | |
|       final-sleep window exponent | 3 | |
|       Number_of_CIDs | 3 | |
|       for (i = 0; i < Number_of_CIDs; i++ { | — | |
|         CID | 16 | |
|       } | — | |
|     } | — | |
|   } | — | |
|   TLV encoded information | variable | |
| } | | |

Referring to Table 6, compared to the MOB_SLP-REQ message illustrated in Table 1, this MOB_SLP-REQ message further includes VLII. The VLII applies only when TTWF is set to 0. If the MS does not support the new sleep-mode operation or if the MS supports the new sleep-mode operation but the BS does not, the VLII is set to '0' all the time.

The VLII parameter has two meanings.

VLII=0: This implies that the MS operates in a basic sleep mode. That is, the listening interval is of a fixed length and the MS and the BS transmit/receive data during the fixed-length listening interval. After the listening interval ends, the MS transitions to the sleep state and operates in the next listening interval.

VLII=1: This means that the MS operates in accordance with the first exemplary embodiment of the present invention. That is, the MS and the BS transmit/receive data during a variable-length listening interval. That is, as long as data to be transmitted/received exists, the listening interval is extended. When another data transmission/reception does not occur for a predetermined time after the data transmission/reception, the MS transitions to the sleep state and operates in the next listening interval.

(2) MOB_SLP-RSP

The MOB_SLP-RSP message is a message that the BS transmits to the MS by the BS, taking into account the statuses of the BS and the MS. It indicates whether the BS approves the MS's entry into the sleep mode. The MOB_SLP-RSP message can also be transmitted in an unsolicited manner. The MOB_SLP-RSP message includes the following parameters, i.e. IEs required for the MS to operate in the sleep mode.

TABLE 7

| Syntax | Size | Notes |
|---|---|---|
| MOB_SLP-RSP_Message_format( ) { | — | — |
|   Management message type = 51 | 8 bits | — |
|   Number or Classes | 8 bits | Number of power saving classes. |
|   for (i = 0; i < Number_of_Classes; i++) { | — | — |
|     Length of Data | 7 bit | |
|     Sleep Approved | 1 bit | |
|     Definition | 1 bit | — |
|     Operation | 1 bit | |
|     Power_Saving_Class_ID | 6 bits | — |
|     If(Sleep_Approved == 1) { | — | |
|       if (Operation == 1) { | — | — |
|         Start_frame_number | 7 bits | |
|         Stop_CQI_Allocation_Flag | 1 bit | |
|       } | — | |
|       if (Definition == 1) { | — | — |
|         initial-sleep window | 8 | |
|         listening-window | 8 | |
|         final-sleep window base | 10 | |

TABLE 7-continued

| Syntax | Size | Notes |
|---|---|---|
|     final-sleep window exponent | 3 | |
|     Traffic_triggered_wakening_flag | 1 | |
|     Power_Saving_Class_Type | 2 | |
|     Direction | 2 | |
|     TRF-IND_Required | 1 | |
|     Reserved | 1 | |
|     Number_of_CIDs | 4 | |
|     for (i = 0; i < Number_of_CIDs; i++ { | — | |
|         CID | 16 | |
|     } | | |
|     if(TRF-IND required) { | — | |
|         SLPID | 10 | |
|         Reserved | 2 | |
|     } | | |
|     If(MDHO or FBSS capability enabled) { | — | If MDHO or FBSS capability is enabled in the REG-REQ/RSP message exchange. |
|         Maintain Diversity Set and Anchor BS | 1 | |
|         If(Maintain Diversity Set and Anchor BS) { | — | |
|             MDHO/FBSS duration (s) | 3 | |
|         } | | |
|     } | | |
|     } | — | |
|     Padding | variable | If needed for alignment to byte boundary |
|   } else { | — | In case sleep approved == 0 |
|     REQ-duration | 8 | |
|   } | — | |
| } | | |
| TLV encoded information | variable | |
| } | | |

Referring to Table 7, the MOB_SLP-RSP message includes VLII, like the MOB_SLP-REQ message illustrated in Table 6. VLII applies for TTWF=0 only.

The value of VLII depends on whether the BS supports the new-sleep mode operation. If the BS does not support the new sleep-mode operation, VLII is set to '0' all the time.

If the BS support the new sleep-mode operation but TTWF is '1', VLII should be set to '0'. When the BS determines that the MS cannot perform the new sleep-mode operation during network entry, or when the BS determines that the MS does not support the new sleep-mode operation in the support of new sleep mode with variable listening interval TLV encoding method, VLII is set to '0' so that the MS operates in the conventional sleep mode.

Now a description will be made of timers proposed for the MS to transition to the awake state during a listening interval.

Assuming that the MS and the BS find out that VLII=1 in the MOB_SLP-REQ message and the MOB_SLP-RSP message and that both support the new sleep-mode operation, they are aware of the end of a variable-length listening interval and the time of transitioning to the sleep state by activating the following timers.

(1) A timer of the MS for the new sleep mode, Timer_in_MS_for_New_SLM: This timer is managed by the MS. The timer starts in the next frame after a listening interval acquired by the MOB_SLP-REQ message and the MOB_SLP-RSP message exchanged between the MS and the BS. The timer is reset each time the MS receives data from the BS in a frame. In the absence of data to be transmitted/received during the listening interval, the MS transitions to the sleep state without activating the timer. When the MS receives a MOB_TRF-IND message without its ID, it transitions to the sleep state. If the timer expires and there is no data to be transmitted to the BS, the MS transitions to the sleep state in the listening interval and is kept in the sleep state until the next listening interval starts. When the next listening interval starts, the timer is activated again. The timer can be activated when the listening interval starts.

(2) A timer of the BS for the new sleep mode, Timer_in_BS_for_New_SLM: This timer is managed by the BS. The timer is activated in every frame and reset each time the BS receives data form the MS in a frame. If the timer expires and there is no data to be transmitted to the MS, the BS considers that the MS has transitioned to the sleep state. Thus, even upon generation of data for the MS, the BS buffers the data until the MS wakes up in the next listening interval. When the next listening interval starts, the timer is activated again.

The timers may count time or frames. If the timers count frames and the values of the timers are 5 frames, the timers expire when there is no data to be transmitted from the BS to the MS or from the MS to the BS for 5 frames.

Meanwhile, for TTWF=0 and VLII=1, the power saving class is deactivated, that is, the MS moves out of the sleep mode by exchanging the MOB_SLP-REQ and MOB_SLP-RSP messages between the MS and the BS, or exchanging the BW-REQ and the uplink sleep control header, and the DL Sleep Control Extended Subheader between them. That is, the MS can deactivate the power saving class, i.e. terminate the sleep mode by management messages.

If the timer expires or no data to be transmitted or received exists, the MS transitions to the sleep state. However, if the MS is to transition to the sleep state before the timer expiration, it can transition to the sleep state using a management message. If the BS is to transition the MS to the sleep state, it transmits an unsolicited management message to the MS.

A third exemplary embodiment of the present invention is the same as the second exemplary embodiment of the present invention, except that VLII is included in the form of TLV encoding in the MOB_SLP-REQ and MOB_SLP-RSP messages, not as a parameter.

In accordance with the third exemplary embodiment of the present invention, the MOB_SLP-REQ and MOB_SLP-RSP messages have the formats illustrated in Table 1 and Table 2, respectively. The TLV encoding is given as follows.

TABLE 8

| Type | Length | Value | Scope |
|---|---|---|---|
| X | 1 | Power Saving Class ID: 6bit<br>Variable Listening Interval<br>Indicator: 1 bit<br>Reserved: 1bit (LSB) | SLP-REQ/RSP |

As shown in Table 8, the TLV encoding includes Power Saving Class ID and a VLII value for the Power Saving Class ID. The TLV encoding is included only if the MS and the BS can perform or support the new sleep-mode operation and TTWF is set to 0 for the power saving class in the MOB_SLP-REQ and MOB_SLP-RSP messages have the formats illustrated in Table 1 and Table 2.

In accordance with a fourth exemplary embodiment of the present invention, the BS and the MS operate in the same manner as in the second exemplary embodiment of the present invention, except that the proposed timers operate in a different manner.

If the MS supports the new sleep-mode operation, the Support of new sleep mode with variable listening interval TLV encoding proposed in the second exemplary embodiment of the present invention can be included together with TLV encoding illustrated in Table 9 in an REG-REQ message.

TABLE 9

| Type | Length | Value | Scope |
|---|---|---|---|
| X | 1 | Timer_in_MS_for_New_SLM<br>(unit: frame) | REG-REQ/RSP |

If the REG-REQ message includes only the Support of new sleep mode with variable listening interval TLV encoding without the TLV encoding illustrated in Table 9, it is considered that the TLV encoding is a default value.

Therefore, the BS checks the REQ-REQ message received from the MS and replies with an REG-RSP message including the Support of new sleep mode with variable listening interval TLV encoding and TLV encoding illustrated in Table 10.

TABLE 10

| Type | Length | Value | Scope |
|---|---|---|---|
| Y | 1 | Timer_in_MS_for_New_SLM<br>(unit: frame) | REG-REQ/RSP |

Referring to Table 10, Timer_in_MS_for_New_SLM can be equal to the requested value in the REG-REQ message, or different from the requested value within an allowed range supported by the BS. The value of Timer_in_MS_for_New_SLM is set to be larger than that of Timer_in_BS_for_New_SLM.

The BS may transmit only the Support of new sleep mode with variable listening interval TLV encoding without the TLV encoding illustrated in Table 10 by the REG-RSP message. In this case, the MS determines that the timer Timer_in_MS_for_New_SLM is activated to a predetermined value.

The timer proposed in the fourth exemplary embodiment of the present invention can be set to a different value for each power saving class. That is, a different timer value can be set for the data pattern, i.e. connection of each power saving class. In this case, the TLV encoding has the following format.

TABLE 11

| Type | Length | Value | Scope |
|---|---|---|---|
| Z | 2 | Power Saving Class ID: 6bit<br>Variable Listening Interval<br>Indicator: 1 bit<br>Timer_in_MS_for_New_SLM: 8 bit<br>Reserved: 1bit (LSB) | SLP-REQ/RSP |

Referring to Table 11, the TLV encoding is included only if the MS and the BS can perform or support the new sleep-mode operation and TTWF is set to 0 for the power saving class in the MOB_SLP-REQ and MOB_SLP-RSP messages have the formats illustrated in Table 1 and Table 2. The MS may request Timer_in_MS_for_New_SLIM.

Also, VLII can be included as a parameter, not as TLV encoding in the MOB_SLP-REQ and MOB_SLP-RSP messages in the second exemplary embodiment of the present invention. In this case, the timer Timer_in_MS_for_New_SLIM is defined in the form of TLV encoding illustrated in Table 12. That is, when VLII is transmitted as a parameter, the timer Timer_in_MS_for_New_SLIM is transmitted in the following TLV format.

TABLE 12

| Type | Length | Value | Scope |
|---|---|---|---|
| K | 2 | Power Saving Class ID: 6bit<br>Timer_in_MS_for_New_SLM: 8 bit<br>Reserved: 2bit (LSB) | SLP-REQ/RSP |

For a power saving class with TTWF=0 and VLII=1, the above TLV encoding can be included to notify the MS of the value of Timer_in_MS_for_New_SLIM.

As described above, the present invention advantageously reduces the power consumption of an MS by controlling a sleep-mode operation between the MS and a BS by use of timers.

What is claimed is:

1. A method for controlling a sleep-mode operation in a Mobile Station (MS) in a communication system, comprising:
    transmitting a first message including a variable listening interval indicator (VLII) to a Base Station (BS) in order to transition from awake mode to sleep mode;
    transitioning to an awake state of the sleep mode, when a listening interval comes in a sleep state of the sleep mode; and
    performing one of a first operation, a second operation, and a third operation according to the VLII in the awake state,
    wherein the first operation is for receiving data from the BS, the second operation is for transmitting data to the BS, and the third operation is for receiving data from the BS and transmitting data to the BS.

2. The method of claim 1, further comprising, if the VLII is set to 0, determining whether the listening interval has ended and transitioning to the sleep state when the listening interval has ended, after the one operation is performed.

3. The method of claim 1, further comprising, if the VLII is set to 1, determining whether the one operation continues until the listening interval ends, and performing the one operation by extending the listening interval, if the one operation continues even at the end of the listening interval.

4. The method of claim 3, wherein the performing of the one operation by extending the listening interval comprises activating a timer for the extended listening interval.

5. The method of claim 3, further comprising:
activating a timer when the listening interval starts; and
resetting the timer if there is at least one of data to transmit to the BS and data to receive from the BS.

6. The method of claim 4, further comprising transitioning to the sleep state, after the one operation is completed during the extended listening interval.

7. The method of claim 1, wherein the VLII is included in the form of one of a parameter and a Type, Length, Value (TLV) in the first message.

8. The method of claim 3, further comprising transmitting a requested value of a timer managed by the MS in a second message during network entry.

9. The method of claim 8, wherein the second message transmission comprises transmitting a different requested timer value according to a data traffic connection in the second message.

10. A method for controlling a sleep-mode operation in a Base Station (BS) in a communication system, comprising:
receiving a first message including a variable listening interval indicator (VLII) from a Mobile Station (MS);
transmitting a second message including the VLII to the MS in response to the first message; and
performing one of a first operation, a second operation, and a third operation according to the VLII, after determining that the MS is kept in a sleep state of sleep mode and transitions to an awake state of the sleep mode as a listening interval comes,
wherein the first operation is for transmitting data to the MS, the second operation is for receiving data from the MS, and the third operation is for transmitting data to the MS and receiving data from the MS.

11. The method of claim 10, further comprising, if the VLII is set to 0, determining that the MS has transitioned to the sleep state, if there is no data to transmit to the MS and no data to receive from the MS or if the listening interval ends, after the one operation is performed.

12. The method of claim 10, further comprising, if the VLII is set to 1, determining whether the one operation continues until the listening interval ends, and performing the one operation by extending the listening interval, if the one operation continues even at the end of the listening interval.

13. The method of claim 12, wherein the performing of the one operation by extending the listening interval comprises activating a timer for the extended listening interval.

14. The method of claim 12, further comprising:
activating a timer when the listening interval starts; and
resetting the timer if there is at least one of data to transmit to the MS and data to receive from the MS.

15. The method of claim 9, wherein the VLII is included in the form of one of a parameter and a Type, Length, Value (TLV) in the second message.

16. The method of claim 13, further comprising:
receiving a third message for network entry from the MS; and
generating a fourth message including a value of a timer managed by the MS in response to the third message and transmitting the fourth message to the MS.

17. The method of claim 16, wherein the generation and transmission comprises including one of a timer value requested by the MS and a timer value set by the BS in the fourth message and transmitting the fourth message to the MS.

18. A method for controlling a sleep-mode operation in a Mobile Station (MS) in a communication system, comprising:
starting a timer in a listening interval of a sleep mode, when data is transmitted between the MS and a Base Station (BS)
maintaining the listening interval of the sleep mode in an awake state, until the timer expires; and
restarting the timer, if additional data is received from the BS,
wherein the timer is used for a listening window extension of the MS.

19. The method of claim 18, wherein the timer is started simultaneously with the data being transmitted between the MS and the BS.

20. The method of claim 18, further comprising:
increasing the timer, when the MS determines that there is no additional data to transmit to the BS and no additional data to receive from the BS; and
transitioning from the awake state to a sleep state, when the timer expires.

21. A method for controlling a sleep-mode operation in a Base Station (BS) in a communication system, comprising:
starting a timer in a listening interval of a sleep mode, when data is transmitted between a Mobile Station (MS) and the BS;
maintaining the listening interval of the sleep mode in an awake state, until the timer expires; and
restarting the timer, if additional data is received from the MS;
wherein the timer is used for a listening window extension of the BS.

22. The method of claim 21, wherein the timer is started simultaneously with the data being transmitted between the MS and the BS.

23. The method of claim 21, further comprising:
increasing the timer, when the BS determines that there is no additional data to transmit to the MS and no additional data to receive from the MS; and
transitioning from the awake state to a sleep state, when the timer expires.

24. The method of claim 21, wherein the timer includes at least one of a second timer and a third timer,
wherein the second timer counts an interval during which the MS can determine an absence of data to receive from the BS or the BS can determine an absence of transmission data for the MS, and
wherein the third timer counts an interval during which the MS can determine an absence of transmission data for the BS or the BS can determine absence of data to receive from the MS.

* * * * *